O. PETERMANN.
ESCAPEMENT MECHANISM FOR TYPE WRITING MACHINES.
APPLICATION FILED OCT. 5, 1911.
1,121,040.
Patented Dec. 15, 1914.
2 SHEETS—SHEET 1.
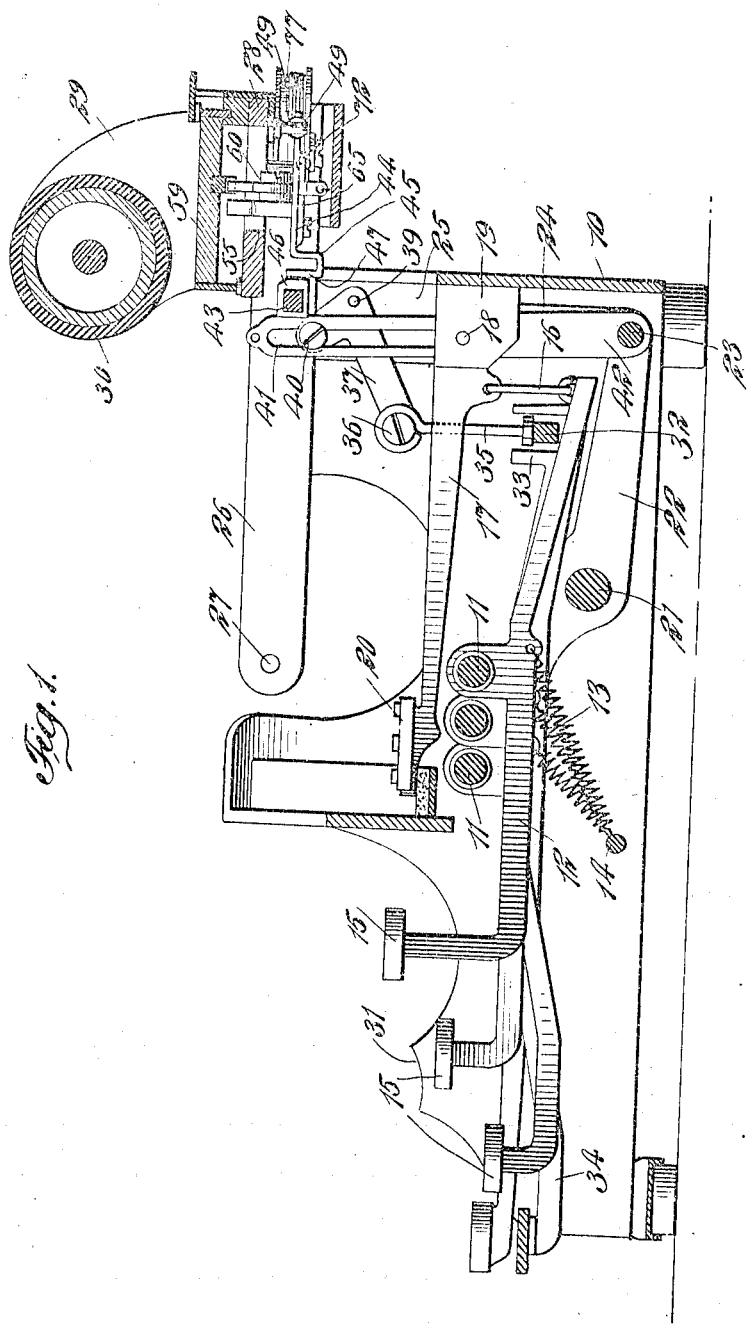
Inventor
Otto Petermann
By his Attorneys
Criswell & Criswell O. PETERMANN.
ESCAPEMENT MECHANISM FOR TYPE WRITING MACHINES.
APPLICATION FILED OCT. 5, 1911.
1,121,040.
Patented Dec. 15, 1914.
2 SHEETS—SHEET 2.
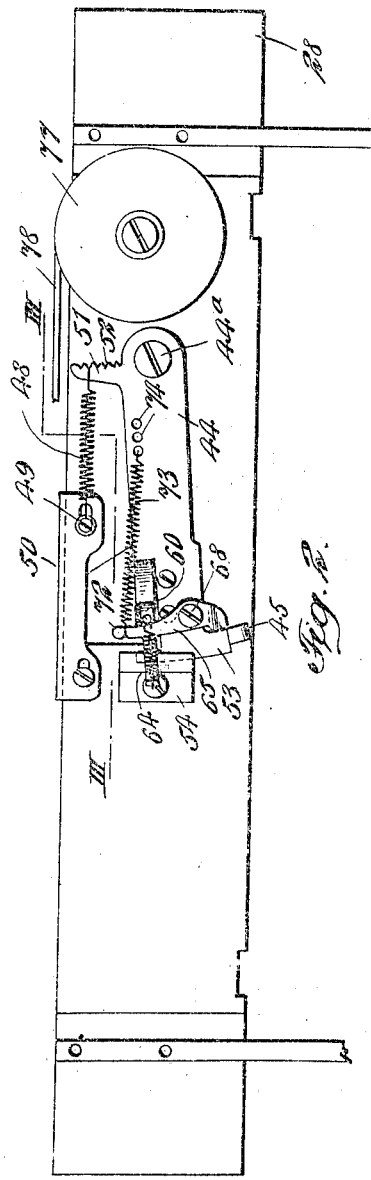
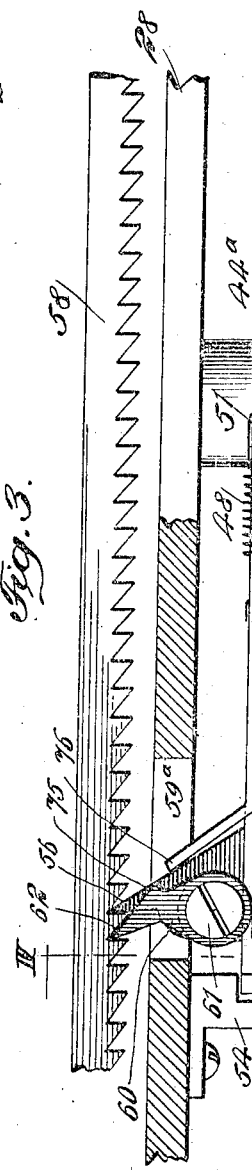
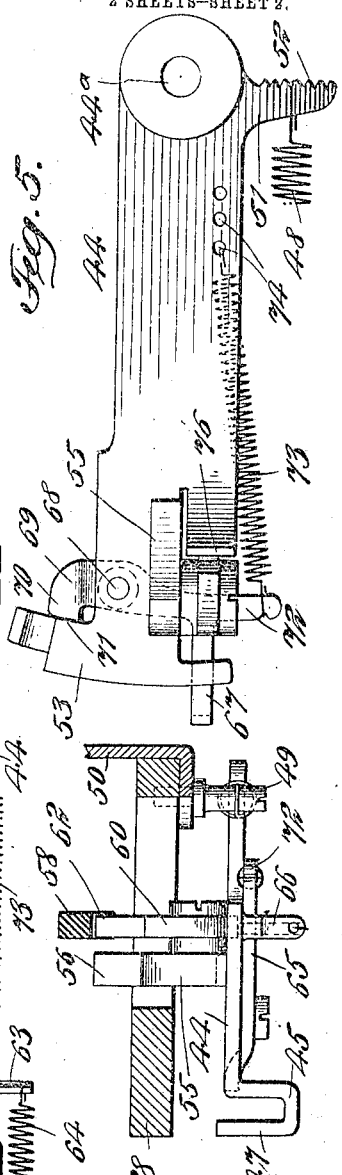
Witnesses:
Inventor
Otto Petermann
By his Attorneys
Criswell & Criswell.

UNITED STATES PATENT OFFICE.

OTTO PETERMANN, OF GROTON, NEW YORK, ASSIGNOR TO CORONA TYPEWRITER COMPANY, INCORPORATED, A CORPORATION OF NEW YORK.

ESCAPEMENT MECHANISM FOR TYPE-WRITING MACHINES.

1,121,040.

Specification of Letters Patent.  Patented Dec. 15, 1914.

Application filed October 5, 1911. Serial No. 652,824.

*To all whom it may concern:*

Be it known that I, OTTO PETERMANN, a citizen of the Republic of Switzerland, and a resident of Groton, county of Tompkins, and State of New York, have invented certain new and useful Improvements in Escapement Mechanisms for Type-Writing Machines, of which the following is a full, clear, and exact description.

This invention relates more particularly to the dogs and dog carrier of the escapement mechanism of typewriting machines such as disclosed in the patent to F. S. Rose, No. 948,553, dated February 8, 1910, in which the platen and carriage are folded forward into overhanging relation to the keys or the type-bars in order that the machine may occupy less space than when in use.

In the patent referred to, the fixed and loose dogs are mounted upon a pivotally held and horizontally movable arm or carrier, and the loose dog is held in a certain position with relation to the fixed dog by means of a wire spring mounted upon said carrier. In addition to this means it has been the practice on machines of this class to position the loose dog and to control its movement by two flat springs of relatively different lengths acting upon different parts of said loose dog. While such methods are satisfactory and effective for accomplishing the result sought, there are many objections and disadvantages to such constructions. Where the flat springs are employed, the said springs are necessarily of such strength as to properly control the loose dog, as it is necessary that the loose dog be given a certain amount of drop to have its engaging end normally out of alinement with the fixed dog, in order that the said loose dog may properly reënter between the teeth of the rack mounted on the carriage. This results in much friction between the dog and rack and consequently there is more or less noise and in addition, unnecessary wear on the teeth of both the rack and the dogs. Besides the adjustment with relation to the springs as ordinarily employed is not easily effected, and the relative position of the dogs is also not easily obtained.

The primary object of the invention is to overcome the objectionable features referred to and to provide simple and efficient means whereby the loose dog may be effectively and easily adjusted with relation to the fixed dog in order to give the desired amount of drop thereto, and so to arrange and construct the parts that much lighter springs may be employed, thereby making the operation of the machine less noisy, and materially reducing the friction and consequently the wear upon the teeth of the rack as well as the engaging teeth or ends of the dogs.

Another object of the invention is to provide simple means whereby the springs which control the dogs are so arranged that they will not act one against the other, and to provide simple means whereby the exact position of the loose dog may be readily and quickly determined.

A further object of the invention is to provide simple means whereby the carrier or arm which supports the dogs may have an adjustable tension applied thereto for restoring the carrier and dogs to their normal working position after being actuated by means connected with the universal bar.

A still further object of the invention is to provide a dog carrier which may be made of substantially a single piece, and which has an adjustable and bendable part to adapt another part of the escapement mechanism independent thereof to engage and move the carrier when any of the key-operated levers are depressed.

With these and other objects in view, the invention will be hereinafter more particularly described with reference to the accompanying drawings, which form a part of this specification, and will then be pointed out in the claims at the end of the description.

In the drawings, Figure 1 is a longitudinal section, partly in elevation, of a machine showing one form of my invention applied thereto. Fig. 2 is an inverted plan of the carriage bed showing the dog carrier in its normal working position. Fig. 3 is an enlarged fragmentary view, partly in section and partly in elevation, showing the carrier and dogs mounted thereon. Fig. 4 is a transverse section taken on the line IV—IV of Fig. 3; and Fig. 5 is a detail plan view of the carrier.

While I show the invention as applied to a form of machine adapted for visible writing and in which the carriage and platen are adapted to be folded to make the machine more compact for transportation or other purposes, it is to be understood that the invention may be used in connection with various kinds of typewriting or similar machines.

The frame 10 may be of any suitable form and of any suitable material, and extending transversely between the sides thereof are rods or supports 11 on which the key-levers 12 are suspended. As shown there are three supports to adapt the key-levers to be arranged in groups, and each key-lever is held in its normal position by means of a spring 13, one end of which is held to the key-lever and the other end to a transverse rod 14. The key-levers are each provided with buttons or finger portions 15 at one end, and at their other ends are connected by links 16 to type-bars 17. The type-bars 17 are pivoted at 18 to hangers 19 secured to the rear portion of the frame, and each type-bar has a type-head or block 20 on which are a plurality of type indicating the upper case, lower case, and figures or the like which are adapted to be forced to the printing point when the key-levers are depressed.

A rod 21 extends transversely of the machine to which is held a shift lever 22 one end of which is connected to a transverse bar 23. This transverse bar or rod 23 is connected to the slides or shift rods 24 which are adapted to move vertically in posts or brackets 25 located at the rear corners of the machine, and at their upper ends the said slides are connected to bars forming a part of a support 26. This support 26 has two sets of bars which are pivoted at 27, and mounted on one pair of the bars of said support is a carriage bed 28. A carriage 29 is adapted to move lengthwise of the bed 28 and mounted in the carriage is a platen 30, the said platen and carriage being adapted to be folded forward into overhanging relation to the keys so as to rest on the concaved portion 31 of the machine frame.

A universal bar 32 extends transversely of the machine over the key-levers and this bar may normally rest between and be guided by the slotted ends 33 of the space-bar levers 34. The universal bar 32 is held at its ends to links 35 and these links are pivoted at 36 to the arms 37 of the bell-crank levers 38. There are two bell-crank levers, one at each side of the machine, and said levers are pivoted at 39 to the brackets or posts 25. Each lever 38 carries a screw 40 at one end which normally works in a vertical slot 41 of one of the rock arms 42. These arms 42 are held to rock back and forth on the transverse rod 23 at each movement of the key-levers as each key-lever or the space-bar is depressed, and extending transversely of the machine and rigidly held to the arms 42 is a bar or rod 43, so that said bar will rock with the arms 42 at each reciprocation of the universal bar.

The parts thus far described are substantially the same as disclosed in the patent hereinbefore referred to and may be of any suitable construction.

A dog carrier 44, in this case in the form of an arm, is pivoted at 44ª to the carriage bed 28 and said carrier has a substantially U-shaped or other portion 45 integral with the body thereof, a portion of which is adapted to be engaged by a tappet 46 arranged on the transverse bar 43 or directly by said bar as preferred. This part 45 as will be seen may be readily bent so as to have the vertical portion 47 thereof brought nearer or away from the tappet or the bar 43 to properly position the carrier with respect to the bar. At each movement of the bar 43, the part 47 will be engaged thereby and this will impart a horizontal swinging movement to the carrier. The carrier is normally forced against the action of the bar 43 and restored to its normal position by a spring 48 one end of which is held to a pin or screw 49 which is held to the carriage bed and which also serves to hold a bracket 50 to the bed. The other end of the spring 48 is held to a projecting and integral portion 51 on the dog carrier and this portion has teeth 52 located at different distances from the fulcrum or pivoting point of the carrier so that by moving the spring toward or away from the fulcrum the tension may be increased or diminished as desired. The carrier has a curved end or head 53 concentric with the pivot of the carrier, and this end is adapted to be guided and supported by a slotted angular bracket 54 so as to be guided in an effective way during its horizontal movement.

A substantially triangular fixed dog 55 is mounted upon the carrier near the head 53 and this dog has an end 56 which is adapted to engage the teeth 57 of a rack 58, the said rack being held to and supported by the base plate 59 of the carriage, and the carriage bed 28 being slotted as at 59ª to permit the dog to pass from below said bed to a position to engage the rack. The loose or pivoted dog 60 is spaced somewhat from the fixed dog 55 and has an engaging tooth 62 normally held in engagement with the teeth of the rack 58. The dog 60 has a pendent part or pin 63 to which one end of a spiral or helical spring 64 is held, the other end of said spring being held to one arm of a substantially T-shaped lever 65 and is adapted to force said pin portion against a part of the lever 65. This serves to properly position the tooth 62 of the dog 60 relatively to the tooth 56 of the fixed dog 55, in order that the proper drop may be obtained for the reëntry of the dog to again engage the teeth of the rack after the dog has been moved with the carrier by the operation of the key-levers or in any other way. The lever 65 has a pendent portion 66 on the arm 67 to which one end of the spring 64 is secured, and said lever is pivoted at 68 to the under surface of the carrier. This lever 65 has a part or end 69 projecting to one side of the pivot 68, and this end is bent at an angle, as at 70, and has one edge thereof adapted to engage the inner portion 71 of the enlarged end or head of said carrier. It will be seen that by hammering or otherwise spreading the end 70 of the lever 65, or by filing it off to reduce the same, the position of the arm 72 of said lever located on the opposite side of its pivot 68 will be changed. This will necessarily change the position of the tooth 62 of the loose dog with respect to the tooth of the fixed dog, the relative position of the teeth of the dogs depending upon the position of the arm 72 of the lever 65 against which the spring 64 normally holds the pin 63 of the loose dog. The spring 64 is thus entirely independent of any other action and permits the loose dog to be moved on its pivot against the tension of said spring. The end 72 of the lever 65 has one end of a spiral or helical spring 73 held thereto, the other end of said spring being held in one of several apertures 74 in the dog carrier to adapt the tension of said spring to be varied. This spring 73 forces the lever 65 on its pivot 68 so as to cause the end 70 to be yieldingly held against the surface 71 of the dog carrier and in such a way that the said lever at the proper time may move with the loose dog 60 and still permit the springs 73 and 64 to be entirely independent of each other in their action, thus adapting the springs to be made much lighter and permitting ready adjustment of the springs and parts. The loose dog 60 has its tooth 62 provided with a shoulder 75 which is adapted to engage the upper end of an integral arm or stop 76 extending at an angle from the body of the dog carrier to limit the movement of the dog in one direction and against the tension of the spring 73 when the carriage is forced in one direction for letter spacing.

The carriage may be propelled by any suitable means as by a spring drum 77 mounted on the carriage bed, from which drum extends a flexible connection 78, the end of which is held to the carriage and tends normally to force the same along the carriage bed.

It will be seen that when one of the key-levers is depressed, the universal bar will be actuated, and through the latter and links 35, bell-cranks 37, arms 42, will move the transverse rod 43, and through it engage the part 47 of the dog carrier so as to move the same on its pivot. This action will force the loose dog out of engagement with the rack, but will place the fixed dog in engagement therewith and on the return movement of the carrier, by the action of the spring 73, the carriage will move one space as is usual and in substantially the same way as set forth in the patent hereinbefore referred to.

From the foregoing, it will be seen that simple and efficient means is provided whereby the carrier may have the loose dog mounted thereon and its position controlled by two springs acting entirely independent of each other and each performing its own function, thus adapting much lighter springs to be employed; that said springs by being of a spiral nature may be more readily adjusted and the parts more easily controlled, and by reason of their being light, there is less friction and wear on the rack and dogs and at the same time less noise; that simple means is provided for maintaining and for quickly adjusting the dogs relatively to each other to provide proper drop in order that the reëntry of the dogs is provided for; that simple means is provided whereby a ready adjustment is obtained between the carrier and the other operating parts of the escapement mechanism; that simple means is provided for varying the tension of the spring for moving the dog carrier in one direction, and that said carrier and parts mounted thereon may be readily made and assembled.

Having thus described my invention, I claim as new and desire to secure by Letters Patent:—

1. In a typewriting machine, the combination of a support, a carriage adapted to move along said support, a dog carrier pivotally held to the support, a pivoted and a fixed dog mounted on the carrier, said pivoted dog being actuated on its pivot in opposite directions according to the movement of the carriage, and springs acting independent of each other tending to yieldingly hold the pivoted dog against movement.

2. In a typewriting machine, the combination of a support, a carriage adapted to move along said support, a dog carrier pivotally held to the support, a loose and a fixed dog mounted on the carrier, said loose dog being actuated directly by the carriage in opposite directions according to the movement of said carriage, and springs acting independent of each other tending to yieldingly hold the loose dog against movement.

3. In a typewriting machine, an escapement mechanism having a fixed dog and a pivoted dog adapted to be moved from a normal position in opposite directions on its pivot, and a plurality of springs acting on the pivoted dog one at a time and entirely independent of each other tending normally to hold the pivoted dog against movement.

4. In a typewriting machine, an escapement mechanism having a fixed dog and a pivoted dog adapted to be moved from a normal position in opposite directions on its pivot, and two springs acting one at a time to hold the pivoted dog against movement.

5. In a typewriting machine, an escapement mechanism having a fixed dog and a pivoted dog adapted to be moved from a normal position in opposite directions on its pivot, and two coiled springs acting on the pivoted dog one at a time one directly tending to hold the pivoted dog against movement in one direction and the other spring tending to hold said pivoted dog against movement in the opposite direction.

6. In a typewriting machine, the combination of a support, a carriage adapted to move along said support, a dog carrier held to the support, a fixed and a pivoted dog mounted on the carrier, an independent lever pivotally held to the carrier intermediate its ends and having a part thereof adapted to engage the pivoted dog to position the same relatively to the fixed dog, and two springs one acting on the pivoted dog and the other on the lever and entirely independent of each other and adapted to yieldingly hold said pivoted dog against movement in either direction on its pivot.

7. In a typewriting machine, the combination of a support, a carriage adapted to move along said support, a dog carrier held to the support, a fixed and a loose dog mounted on the carrier, an independent lever pivotally held to the carrier and having a part thereof adapted to engage the loose dog to position the same relatively to the fixed dog, and two springs one acting on the loose dog and the other on the lever and entirely independent of each other.

8. In a typewriting machine, the combination of a support, a carriage adapted to move along said support, a dog carrier held to the support, a fixed and a loose dog mounted on the carrier, said loose dog being movable in opposite directions, an independent lever mounted on the carrier and having a part thereof adapted to engage the loose dog to position the same relatively to the fixed dog, and means acting independently on the loose dog and the lever tending to hold the loose dog against movement in either direction.

9. In a typewriting machine, the combination of a support, a carriage, means for forcing the carriage along said support, a movable dog carrier having a loose dog pivoted thereto and a fixed dog adapted to control the letter-spacing movement of the carriage, and two springs having their tension exerted in opposite directions and acting on the loose dog entirely independent of each other, one to position the loose dog with relation to the fixed dog, and the other to permit the loose dog to move on its pivot under the force of the carriage.

10. In a typewriting machine, the combination of a support, a carriage, means for forcing the carriage along said support, a dog carrier having a loose and a fixed dog adapted to control the letter-spacing movement of the carriage, a light spring to position the loose dog with relation to the fixed dog and to permit the dog to move readily during the backward movement of the carriage, a second and stronger spring acting entirely independent of the lighter spring and adapted to permit the loose dog to move under the strain of the carriage forcing means, and means for operating the carrier.

11. In a typewriting machine, the combination of a support, a carriage, means for forcing the carriage along said support, a rack movable with the carriage, a dog carrier having a pivoted dog and a fixed dog adapted to control the letter-spacing movement of the carriage, and two springs of relatively different strengths having their tension exerted in opposite directions and acting entirely independent of each other, one to position the pivoted dog with relation to the fixed dog and to permit the dog to move on its pivot during the movement of the carriage in one direction, and the other to permit the pivoted dog to move on its pivot during the movement of the carriage in the opposite direction and under the strain of the carriage forcing means, and means for moving the carrier.

12. In a typewriting machine, the combination of a support, a carriage adapted to move along said support, a dog carrier having a pivoted and a fixed dog mounted thereon, and two springs of variable strength acting entirely independent of each other and exerting their tension in opposite directions and both permitting the loose dog to move on its pivot in opposite directions, one of said springs having a bodily movement when the other spring is in action.

13. In a typewriting machine, the combination of a support, a carriage, means for forcing the carriage along said support, a rack movable with the carriage, a dog carrier having a pivoted and a fixed dog adapted to control the letter-spacing movement of the carriage, and two springs of variable tension acting on the loose dog entirely independent of each other to move the dog on its pivot in opposite directions, one to position the pivoted dog relatively to the fixed dog and to permit the pivoted dog to move during the return of the carriage, and the other spring acting on the pivoted dog to permit it to move on its pivot in the opposite direction under the strain of the carriage forcing means and during each pivotal action cause a bodily movement of the dog-positioning spring.

14. In a typewriting machine, the combination of a support, a carriage adapted to move along said support, a dog carrier pivotally held to the support, said carrier having an engaging portion, two dogs one fixed and the other pivotally mounted on the carrier, a lever held to the carrier independent of either dog and having one end adapted to engage the engaging portion of the carrier to hold said lever against movement in one direction but permitting the dog to force it in the opposite direction, and independent means acting on the lever and the dog to control the action of the latter.

15. In a typewriting machine, the combination of a support, a carriage adapted to move along said support, a rack held to the carriage, a dog carrier held to the support, loose and fixed dogs mounted on the carrier, a lever engaging the loose dog and independent thereof for controlling the position thereof, and springs one mounted on the lever and connected to the loose dog and the other yieldingly holding the lever and loose dog against action.

16. In a typewriting machine, the combination of a support, a carriage mounted to move along said support, a rack movable with the carriage, a dog carrier having a pivoted loose and a fixed dog mounted thereon and adapted to engage the rack, and two springs acting entirely independent of each other to move the loose dog on its pivot in opposite directions to position and control said dog, and means for operating said carrier.

17. In a typewriting machine, the combination of a support, a carriage mounted to move along said support, a dog carrier having a pivoted loose dog and a fixed dog mounted thereon, and two springs acting entirely independent of each other and acting on the loose dog to move the latter on its pivot and to position and control said dog, and means for operating said carrier.

18. In a typewriting machine, the combination of a support, a carriage mounted to move along said support, a rack movable with the carriage, a dog carrier having a loose dog pivoted thereon and adapted to engage the rack, and two spiral springs acting entirely independent of each other on the loose dog and in opposite directions to position and to permit a pivotal action of said dog in opposite directions by the movements of the carriage, and means for operating said carrier.

19. In a typewriting machine, the combination of a support, a carriage adapted to move along said support, a rack movable with the carriage, a dog carrier pivotally held to the support and movable horizontally and transversely of the rack, a fixed and a loose dog mounted upon the carrier and adapted to engage the rack, a lever pivotally held to the carrier and adapted to form a stop to position the loose dog relatively to the fixed dog, a spring connecting the lever to the dog, an independent spring connecting the lever to the carrier, and means for operating the carrier.

20. In a typewriting machine, the combination of a support, a carriage adapted to move along said support, a movable dog carrier pivotally held to the support, fixed and loose dogs mounted upon the carrier and adapted to control the letter spacing movement of the carriage, a lever pivotally held to the carrier and adapted to form a stop to position the loose dog relatively to the fixed dog, and means for positioning the loose dog with respect to the lever and for yieldingly holding the latter to hold said dog against pivotal action.

21. In a typewriting machine, the combination of a support, a carriage adapted to move along said support, a rack movable with the carriage, a dog carrier pivotally held to the under side of the support and movable horizontally and transversely of the rack, a fixed and a loose dog mounted upon the carrier and adapted to engage the rack, means adapted to form a stop to position the loose dog relatively to the fixed dog, a spring connecting said means to the dog, an independent spring connecting said means to the carrier, and means for operating the carrier.

22. In a typewriting machine, the combination of a support, a carriage adapted to move along said support, a rack held to the carriage, a dog carrier pivotally held to the support at one end and guided on said support at the other end, said carrier having an engaging portion, two dogs one fixed and the other loose mounted upon the carrier, a substantially T-shaped lever pivotally held to the carrier and having one end adapted to engage the engaging portion of the carrier, a spring connecting the lever to the loose dog, an independent spring connecting the lever to the carrier, and means for operating the carrier.

23. In a typewriting machine, the combination of a support, a carriage adapted to move along said support, a rack held to the carriage, a dog carrier pivotally held to the support at one end and guided on said support at the other end, said carrier having an engaging portion, loose and fixed dogs mounted on the carrier, said carrier having an integral projecting part to limit the movement of the loose dog, a lever pivotally held to the carrier and having one end adapted to engage the engaging portion of the carrier, and springs coöperating with said lever to position and control the movements of the loose dog.

This specification signed and witnessed this 29th day of September, A. D. 1911.

OTTO PETERMANN.

Witnesses:
LEONIE M. BACKUS,
W. G. RHODES.